US012663128B1

(12) United States Patent
Zhang

(10) Patent No.: US 12,663,128 B1
(45) Date of Patent: Jun. 23, 2026

(54) SOLAR MODULAR STEP LIGHT

(71) Applicant: Shone Intelligent Optoelectronics (Guangdong) Co., Ltd, Guangzhou (CN)

(72) Inventor: Huiqiang Zhang, Guangzhou (CN)

(73) Assignee: Shone Intelligent Optoelectronics (Guangdong) Co., Ltd, Guangzhou (CN)

( * ) Notice: Subject to any disclaimer, the term of this patent is extended or adjusted under 35 U.S.C. 154(b) by 0 days.

(21) Appl. No.: 19/536,147

(22) Filed: Feb. 10, 2026

(30) Foreign Application Priority Data

Jun. 12, 2025 (CN) ........................ 202521204495.X
Jan. 23, 2026 (CN) ........................ 202620100589.0

(51) Int. Cl.

*F21S 9/03* (2006.01)
*F21V 23/04* (2006.01)
*F21W 111/027* (2006.01)
*F21Y 115/10* (2016.01)

(52) U.S. Cl.

CPC ............... *F21S 9/035* (2013.01); *F21S 9/037* (2013.01); *F21V 23/04* (2013.01); *F21W 2111/027* (2013.01); *F21Y 2115/10* (2016.08)

(58) Field of Classification Search

CPC ............ F21S 9/035; F21S 9/037; F21S 8/022; F21W 2111/027; F21W 2111/023; E04F 2011/1048; F21V 23/04

See application file for complete search history.

(56) References Cited

U.S. PATENT DOCUMENTS

2008/0272278 A1* 11/2008 Shewa .................... F21S 9/037 250/206
2014/0218900 A1* 8/2014 Adair ...................... F21S 8/022 362/183

FOREIGN PATENT DOCUMENTS

CN 201803263 U * 4/2011
CN 106678710 A * 5/2017 ............ F21V 23/023
CN 106996178 A * 8/2017 ............ F21V 33/006
KR 20090020447 A * 2/2009 ............... F21K 9/61
KR 102736061 B1 * 12/2024 ............. H02S 40/20

* cited by examiner

*Primary Examiner* — Erin Kryukova

(57) ABSTRACT

A solar modular step light includes a lamp body; a solar panel; a lamp board; a rechargeable battery; and a circuit board. An upper portion and a lower portion of the lamp body are provided with a mounting groove and a recess respectively. The lamp board is mounted in the mounting groove. An edge of the recess is provided with a supporting strip. The rechargeable battery and the circuit board are mounted at a bottom of the recess. The solar panel mounted on the supporting strip forms an inclined surface relative to a horizontal plane. The rechargeable battery, the circuit board and the lamp board are electrically connected. The circuit board is provided with a magnetic control switch configured to control an on-off status of a circuit between the rechargeable battery and the lamp board, and a magnet is attached to the lamp body corresponding to the magnetic control switch.

11 Claims, 5 Drawing Sheets

SOLAR MODULAR STEP LIGHT

CROSS-REFERENCE TO RELATED APPLICATIONS

The present disclosure claims priority of Chinese Utility model Application No. 202521204495.X, filed on Jun. 12, 2025 and Chinese Utility model Application No. 202620100589.0, filed on Jan. 23, 2026, the entire contents of which are hereby incorporated by reference.

TECHNICAL FIELD

The present disclosure relates to the technical field of step lights, and in particular to a solar modular step light.

BACKGROUND

In daily life, stair is widely used in many locations with height differences. However, in some environments with insufficient ambient lighting, the stair treads are often relatively dark, making it difficult for pedestrians to see clearly while walking. Existing step lights generally adopt flexible light strips fixed to the front edges of the stair treads, or triangular lamps arranged at both ends of the stair tread to project light toward the middle. Moreover, most of these step lights rely on an external power supply, which not only results in inadequate illumination of the stair treads but also requires the installation of external power cables, thereby complicating installation. In addition, some existing solar lamp structures are complex and cannot be directly applied to steps. Such structures usually have a large overall thickness and may easily cause tripping hazards after installation. Furthermore, existing step light structures are relatively complex, cannot satisfy usage requirements in the North American market, and also suffer from inconvenient installation.

Therefore, there remains a need to further improve the existing technology.

SUMMARY

The main objective of the present disclosure is to provide a solar modular step light, which has a slim thickness, fits well with the step structure during installation, does not require external power, and can ensure that the rechargeable battery does not suffer power loss before installation.

In order to achieve the above objective, the present disclosure provides a solar modular step light. The solar modular step light includes a lamp body; a solar panel; a lamp board; a rechargeable battery; and a circuit board. An upper portion of the lamp body is provided with a mounting groove for mounting the lamp board, and a lower portion of the lamp body is provided with a recess for mounting the rechargeable battery and the circuit board. The lamp board is mounted in the mounting groove and fixed by filling with an adhesive, an edge of the recess is provided with a supporting strip for supporting the solar panel, the rechargeable battery and the circuit board are mounted at a bottom of the recess, and the solar panel mounted on the supporting strip forms an inclined surface relative to a horizontal plane. The rechargeable battery is electrically connected to the circuit board and the lamp board respectively, the circuit board is electrically connected to the lamp board, the circuit board is provided with a magnetic control switch configured to control an on-off status of a circuit between the rechargeable battery and the lamp board, and a magnet is attached to a position of the lamp body corresponding to the magnetic control switch.

In some embodiments, an angle between the inclined surface of the solar panel and a vertical line is in a range of 5 to 8 degrees, such that the solar panel has a maximum light-receiving area.

In some embodiments, the angle between the inclined surface of the solar panel and the vertical line is 5.6 degrees, such that the solar panel has the maximum light-receiving area.

In some embodiments, the adhesive is a polyurethane adhesive.

In some embodiments, the polyurethane adhesive is a transparent polyurethane adhesive.

In some embodiments, the lamp body is integrally formed by die casting.

In some embodiments, the lamp body has a maximum thickness of 15 millimeters.

In some embodiments, the lamp body includes a main profile body; two outer end covers; and two inner end covers. The two inner end covers are mounted on two opposite sides of the recess respectively to seal two opposite ends of the solar panel and two opposite ends of the recess. The two outer end covers are respectively fixed to two opposite ends of the main profile body by screws, and each inner end cover and a corresponding outer end cover are filled with a silicone sealant therebetween.

In some embodiments, the lamp board is provided with a plurality of light-emitting diode beads and each light-emitting diode bead has an optical single-layer protective cover, such that a light-emitting diode light source emitted from the plurality of light-emitting diode beads provides a beam angle in a range of 30 to 60 degrees.

In some embodiments, a rear surface of the lamp body is attached with an ethyl vinyl acetate double-sided tape for installation.

In some embodiments, a rear surface of the lamp body is directly fixable to a step by a glue.

In some embodiments, a cross section of the main profile body is trapezoidal.

Beneficial Effects: according to the present disclosure, the solar panel, the lamp board, and the circuit board are highly integrated within the lamp body, thereby achieving an overall slim structure and ensuring that the battery retains sufficient electrical energy before installation of the step light. A recess is provided at the lamp body, a support strip for carrying the solar panel is arranged at an edge of the recess, the rechargeable battery and the circuit board are mounted at the bottom of the recess, and the solar panel is mounted on the support strip. After installation, the solar panel forms an inclined surface, such that the lamp body presents an asymmetrical inclined structure. As a result, after installation, the solar panel attains a maximum light-receiving area, thereby achieving maximum power generation efficiency. In addition, a fully enclosed three-proof structure is adopted, and it achieves an excellent waterproof performance by potting the polyurethane (PU) adhesive.

Figure 1:
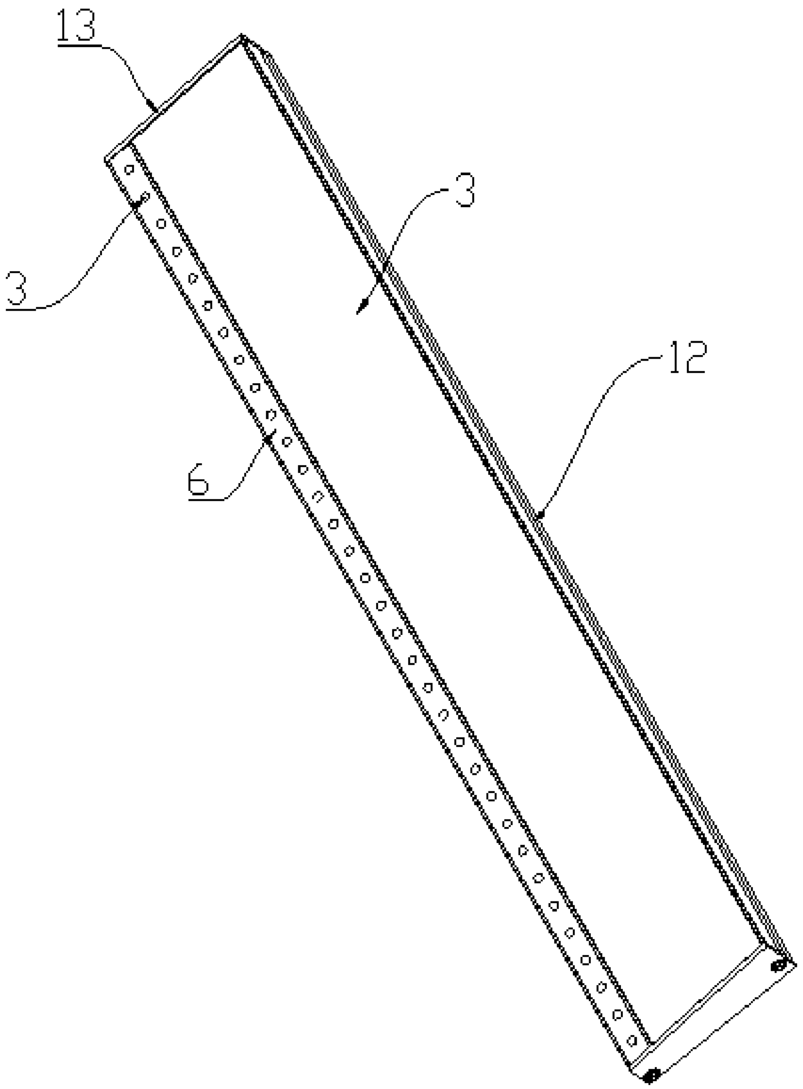
FIG. 1 is a first axonometric view of a solar modular step light according to the present disclosure.
Figure 2:
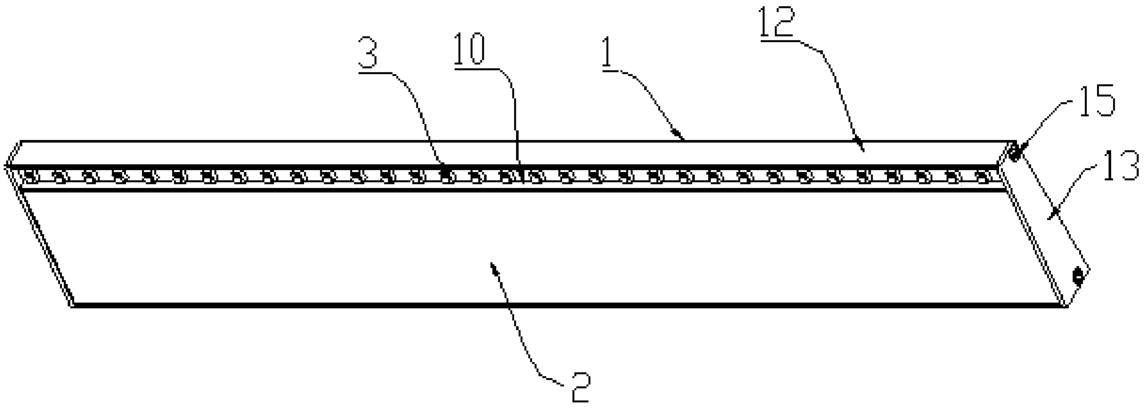
FIG. 2 is a perspective view of the solar modular step light wherein a polyurethane (PU) adhesive has been removed from a lamp board.
Figure 3:
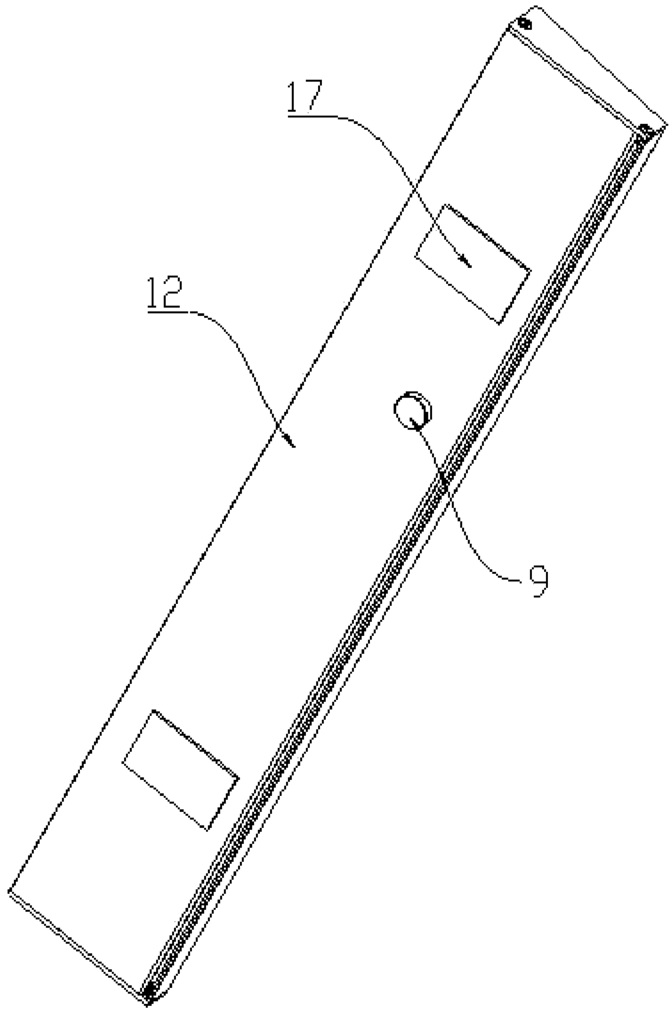
FIG. 3 is a second axonometric view of the solar modular step light according to the present disclosure.
Figure 4:
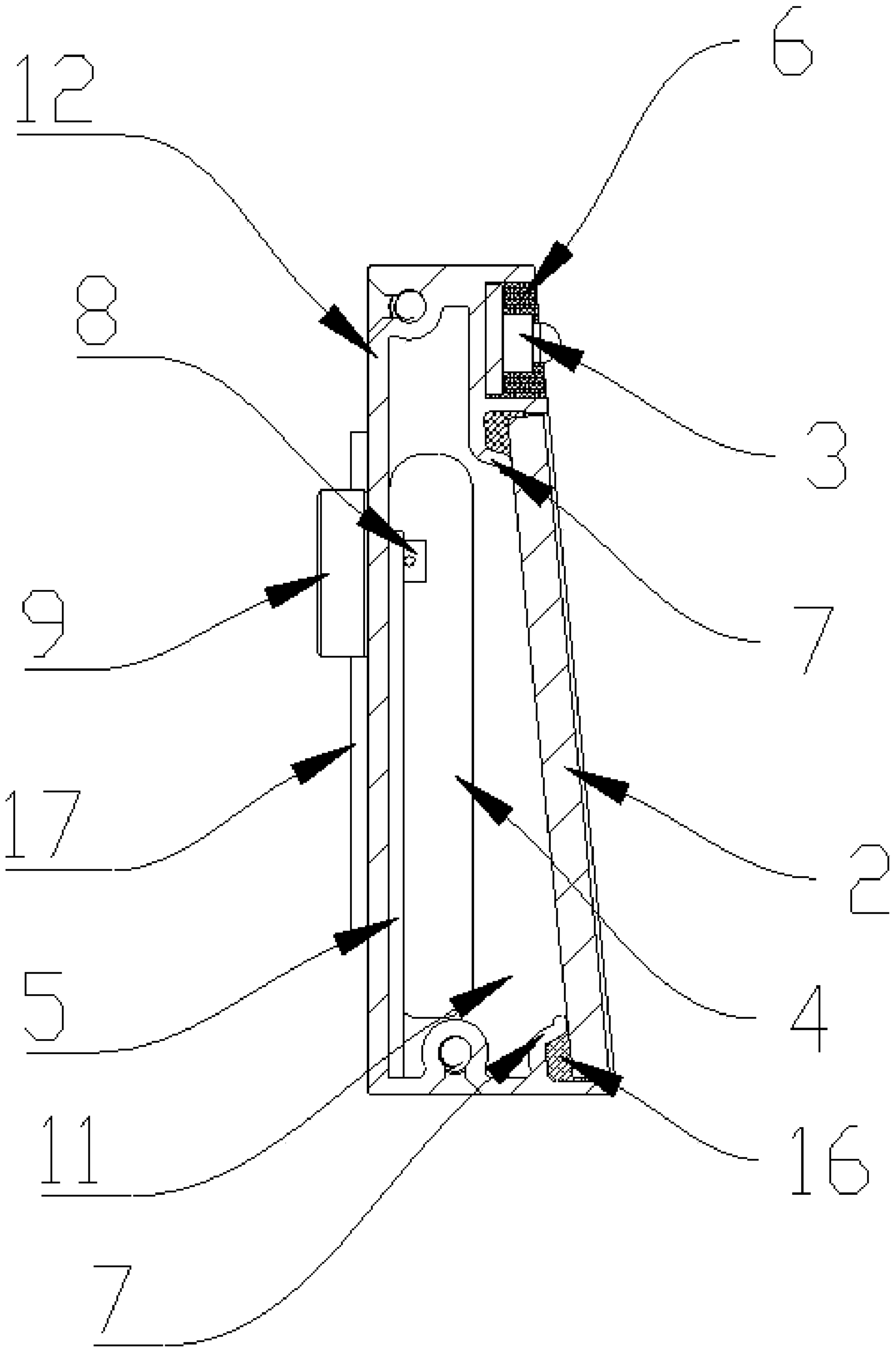
FIG. 4 is a first cross-sectional view of the solar modular step light according to the present disclosure.
Figure 5:
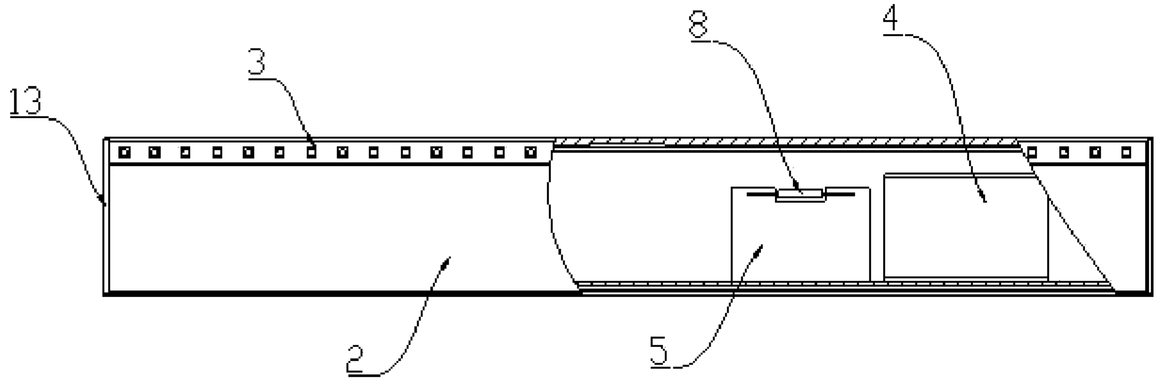
FIG. 5 is a partial cross-sectional view of the solar modular step light according to the present disclosure.
Figure 6:
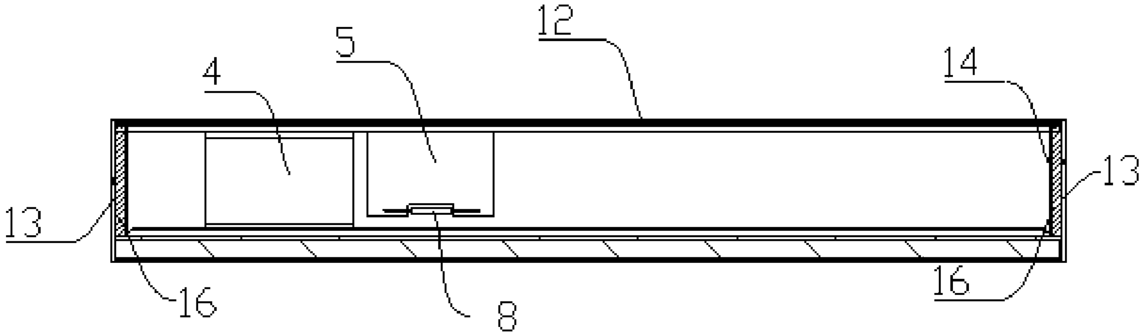
FIG. 6 is a second cross-sectional view of the solar modular step light according to the present disclosure.

Reference numerals: 1—lamp body; 2—solar panel; 3—lamp board; 4—rechargeable battery; 5—circuit board; 6—adhesive; 7—supporting strip; 8—magnetic control switch; 9—magnet; 10—mounting groove; 11—recess; 12—main profile body; 13—outer end cover; 14—inner end cover; 15—screw; 16—silicone sealant; 17—ethyl vinyl acetate (EVA) double-sided tape.

DESCRIPTION OF EMBODIMENTS

To make the objectives, technical solutions, and advantages of the present disclosure clearer and more explicit, the present disclosure is further described in detail below with reference to the accompanying drawings and embodiments.

As shown in FIG. 1 to FIG. 6, the present disclosure discloses a solar modular step light. The solar modular step light includes a lamp body 1, a solar panel 2, a lamp board 3, a rechargeable battery 4, and a circuit board 5. An upper portion of the lamp body 1 is provided with a mounting groove 10 for mounting the lamp board 3, and a lower portion of the lamp body 1 is provided with a recess 11 for mounting the rechargeable battery 4 and the circuit board 5. The lamp board 3 is mounted in the mounting groove 10 and fixed by filling with an adhesive 6. An edge of the recess 11 is provided with a supporting strip 7 for supporting the solar panel 2. The rechargeable battery 4 and the circuit board 5 are mounted at the bottom of the recess 11, and the solar panel 2 is mounted on the supporting strip 7, such that the solar panel 2 mounted on the supporting strip 7 forms an inclined surface relative to a horizontal plane. The rechargeable battery 4 is electrically connected to the circuit board 5 and the lamp board 3, respectively, and the circuit board 5 is electrically connected to the lamp board 3. The circuit board 5 is further provided with a magnetic control switch 8 for controlling an on-off status of a circuit between the rechargeable battery 4 and the lamp board 3. A magnet 9 is attached to a position of a rear surface of the lamp body 1 corresponding to the magnetic control switch 8. In the embodiment, the adhesive 6 is a polyurethane (PU) adhesive.

In other embodiments, the magnetic control switch 8 and the magnet 9 may alternatively be replaced with a touch switch, a push-button switch, or the like.

After adopting the above structure, the present disclosure integrates the rechargeable battery 4, the circuit board 5, and the solar panel 2 within the lamp body 1 by means of a laminated composite structure, thereby achieving an overall slim thickness of the step light and avoiding the bulky appearance of conventional outdoor lamps. Meanwhile, since the lamp board 3 is mounted in the mounting groove 10 and fixed by filling with the adhesive 6, the lamp board 3 has excellent waterproof performance. Because the edge of the recess 11 is provided with the supporting strip 7 for supporting the solar panel 2, the solar panel 2 is mounted on the supporting strip 7 and forms an inclined surface after installation, causing the lamp body 1 to present an asymmetrical inclined structure, so that the solar panel 2 can achieve a maximum light-receiving area. Finally, since the circuit board 5 is provided with the magnetic control switch 8, by attaching the magnet 9 to the rear surface of the lamp body 1, the circuit between the circuit board 5 and the lamp board 3 remains disconnected during transportation, thereby ensuring that the rechargeable battery 4 has sufficient electrical energy after installation.

In some embodiments, the rechargeable battery 4 is a battery capable of being recharged, such as a lithium battery or a lead-acid battery.

Specifically, the inclined surface of the solar panel 2 after installation forms an angle of 5 to 8 degrees relative to a vertical line, such that the light-receiving area of the solar panel is maximized. Therefore, when the solar modular step light is installed on the side surface of an outdoor step, useful light can be accurately projected onto the step steps, being bright yet not glaring.

Specifically, the inclined surface of the solar panel 2 after installation forms an angle of 5.6 degrees relative to the vertical line, such that the light-receiving area of the solar panel 2 is maximized. Therefore, when the solar modular step light is installed on the side surface of an outdoor step, the solar panel 2 receives light over its entire area, thereby achieving maximum power generation efficiency.

The 5.6-degree design is determined as an optimal angle based on the distribution pattern of solar elevation angles at latitudes of 20 to 60 degrees north (the main latitude range of the United States), through extensive simulation calculations and on-site measurements. This angle ensures that, after the lamp is installed on the side surface of a step, the surface of the solar panel 2 forms an optimal angle of incidence with sunlight, avoiding reductions in light-receiving area caused by obstructions such as step handrails and steps, and improving power generation efficiency by 30%.

Specifically, the PU adhesive is a transparent PU adhesive.

Specifically, the maximum thickness of the lamp body 1 is 15 millimeters (mm). Conventional outdoor lamps generally adopt a housing plus discrete components, resulting in a thickness typically reaching 35 to 60 mm. In contrast, the present disclosure tightly laminates and integrates the solar panel 2, the rechargeable battery 4, the circuit board 5, and the lamp board 3, thereby ensuring a waterproof rating. The thickness of 15 mm represents a balanced result between functional realization and form optimization, overcoming technical issues such as component heat dissipation and circuit layout.

Figure 7:
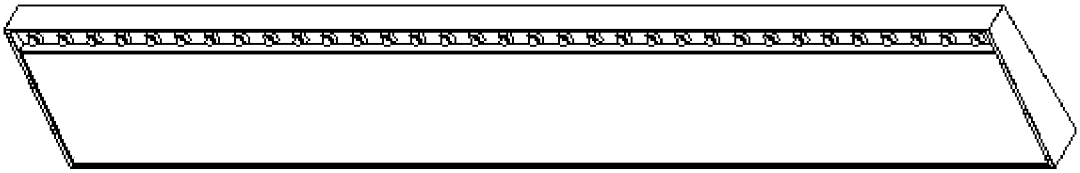
FIG. 7 is another axonometric view of the solar modular step light according to the present disclosure.
Figure 8:
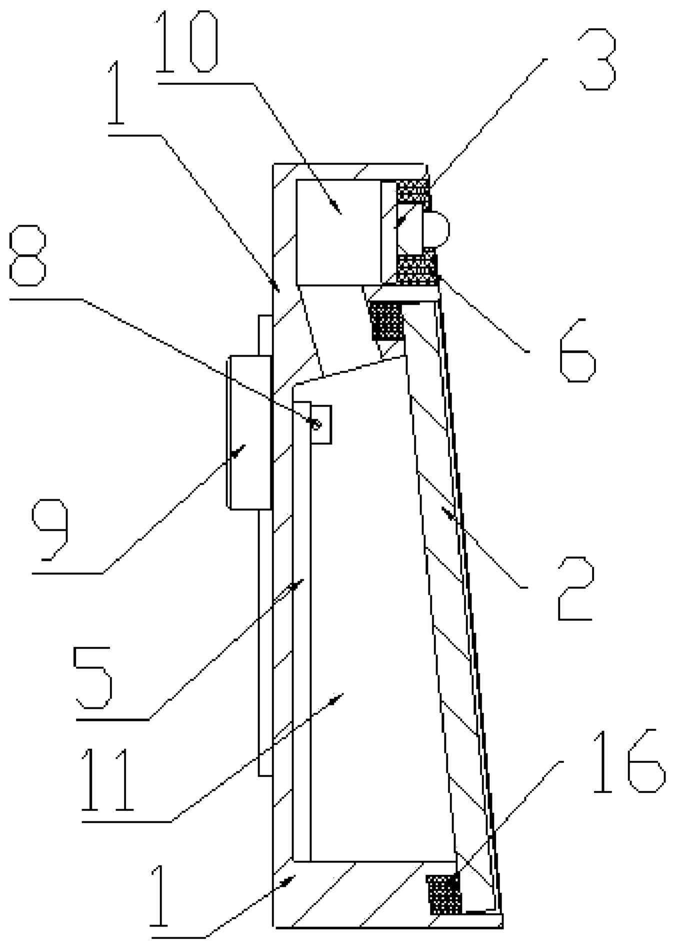
FIG. 8 is another cross-sectional view of the solar modular step light according to the present disclosure.

Specifically, the lamp body 1 is integrally formed by die casting. As shown in FIG. 7 and FIG. 8, the upper portion of the integrally die-cast lamp body 1 is provided with the mounting groove 10 for mounting the lamp board 3, and the lower portion of the lamp body 1 is provided with the recess 11 for mounting the rechargeable battery 4 and the circuit board 5. The edge of the recess 11 is provided with the supporting strip 7 for supporting the solar panel 2. The rechargeable battery 4 and the circuit board 5 are mounted at the bottom of the recess 11, and the solar panel 2 is mounted on the edge of the recess 11, such that the mounted solar panel 2 forms the inclined surface relative to the horizontal plane. The rechargeable battery 4 is electrically connected to the circuit board 5 and the lamp board 3, respectively, and the circuit board 5 is electrically connected to the lamp board 3. The circuit board 5 is further provided with the magnetic control switch 8 for controlling the on-off status of the circuit between the rechargeable battery 4 and the lamp board 3. The magnet 9 is attached to the rear surface of the lamp body 1.

Specifically, the magnet 9 is a strong magnet.

Specifically, the lamp body 1 includes a main profile body 12, two outer end covers 13, and two inner end covers 14. The inner end covers 14 are mounted on two opposite sides of the recess 11 respectively for sealing two opposites ends of the solar panel 2 and the recess 11. The outer end covers 13 are fixed to two opposites ends of the main profile body 12 by screws 15, and a silicone sealant 16 is further filled between each inner end cover 14 and the corresponding outer end cover 13. Since both ends of the lamp body 1 are sealed by the outer end covers 13, both ends of the solar panel 2 and the recess 11 are sealed by the inner end covers 14, and a silicone sealant 16 is filled between each inner end cover 14 and the corresponding outer end covers 13 with a thickness not less than 2 mm, a fully enclosed three-proof structure is achieved. By adopting an outdoor potted waterproof lamp board and sealing both ends of the solar panel 2 with a silicone sealant 16, the waterproof rating reaches IP68.

Specifically, lamp beads on the lamp board 3 adopt a single-layer protective cover, enabling the light-emitting diode (LED) light source emitted from the lamp beads to provide a beam angle in a range of 30 to 60 degrees. Therefore, when the solar modular step light is installed on the side surface of an outdoor step, useful light can be accurately projected onto the step, being bright yet not glaring, achieving precise illumination with anti-glare performance.

Preferably, the lamp board 3 of the step light adopts light-sensing control, realizing automatic illumination at night, with no need for wiring and maintenance.

In another embodiment, the rear surface of the lamp body 1 is attached with an ethyl vinyl acetate (EVA) double-sided tape 17 for installation, such that a back-adhesive installation method can be adopted. During installation, by peeling off the release film of the EVA double-sided tape, the installation may be finished rapidly without tools, requiring only peeling and sticking.

In another embodiment, the rear surface of the lamp body 1 can be directly fixed to a step by a glue, thereby realizing tool-free rapid installation. Verified by measured data, installation efficiency is increased by 20 times, and power generation efficiency is increased by 30%.

According to the present disclosure, by highly integrating the solar panel 2, the lamp board 3, and the circuit board 5 within the lamp body 1, the overall thickness of the step light is reduced, and sufficient battery power before installation is ensured. By providing the recess 11 in the lamp body 1, with the supporting strip 7 arranged at the edge of the recess 11 to support the solar panel 2, the rechargeable battery 4 and the circuit board 5 mounted at the bottom of the recess 11, and the solar panel 2 mounted on the supporting strip 7, so that the solar panel 2 forms an inclined surface after installation, thereby causing the lamp body 1 to present an asymmetrical inclined structure. As a result, after installation, the solar panel 2 achieves a maximum light-receiving area and maximum power generation efficiency. A fully enclosed three-proof structure is adopted, and it achieves an excellent waterproof performance by potting the adhesive 6.

The above descriptions are merely preferred embodiments of the present disclosure and are not intended to limit the scope of rights of the present disclosure. It should be noted that, for those skilled in the art, modifications or equivalent substitutions to the technical solutions of the present disclosure made without creative effort shall not depart from the scope of protection of the present disclosure.

What is claimed is:

1. A solar modular step light, comprising a lamp body; a solar panel; a lamp board; a rechargeable battery; and a circuit board, wherein an upper portion of the lamp body is provided with a mounting groove for mounting the lamp board, and a lower portion of the lamp body is provided with a recess for mounting the rechargeable battery and the circuit board;

wherein the lamp board is mounted in the mounting groove and fixed by filling with an adhesive, an edge of the recess is provided with a supporting strip for supporting the solar panel, the rechargeable battery and the circuit board are mounted at a bottom of the recess, and the solar panel mounted on the supporting strip forms an inclined surface relative to a horizontal plane; and wherein the rechargeable battery is electrically connected to the circuit board and the lamp board respectively, the circuit board is electrically connected to the lamp board, the circuit board is provided with a magnetic control switch configured to control an on-off status of a circuit between the rechargeable battery and the lamp board, and a magnet is attached to a position of the lamp body corresponding to the magnetic control switch.

2. The solar modular step light according to claim 1, wherein an angle between the inclined surface of the solar panel and a vertical line is in a range of 5 to 8 degrees, such that the solar panel has a maximum light-receiving area.

3. The solar modular step light according to claim 2, wherein the angle between the inclined surface of the solar panel and the vertical line is 5.6 degrees, such that the solar panel has the maximum light-receiving area.

4. The solar modular step light according to claim 1, wherein the lamp body has a maximum thickness of 15 millimeters.

5. The solar modular step light according to claim 1, wherein the lamp body is integrally formed by die casting.

6. The solar modular step light according to claim 1, wherein the lamp body comprises a main profile body; two outer end covers; and two inner end covers, wherein the two inner end covers are mounted on two opposite sides of the recess respectively to seal two opposite ends of the solar panel and two opposite ends of the recess; and wherein the two outer end covers are respectively fixed to two opposite ends of the main profile body by screws, and each inner end cover and a corresponding outer end cover are filled with a silicone sealant therebetween.

7. The solar modular step light according to claim 6, wherein a cross section of the main profile body is trapezoidal.

8. The solar modular step light according to claim 1, wherein the lamp board is provided with a plurality of light-emitting diode beads and each light-emitting diode bead has an optical single-layer protective cover, such that a light-emitting diode light source emitted from the plurality of light-emitting diode beads provides a beam angle in a range of 30 to 60 degrees.

9. The solar modular step light according to claim 1, wherein a rear surface of the lamp body is attached with an ethyl vinyl acetate double-sided tape for installation.

10. The solar modular step light according to claim 1, wherein a rear surface of the lamp body is directly fixable to a step by a glue.

11. The solar modular step light according to claim 1, wherein the adhesive is a polyurethane adhesive.

* * * * *